Oct. 12, 1965 R. C. LOSHBOUGH 3,211,245
WEIGHING SCALE

Filed Oct. 8, 1962 3 Sheets-Sheet 1

INVENTOR.
RICHARD C. LOSHBOUGH
BY
Marshall, Wilson, Click & Yeasting
ATTORNEYS

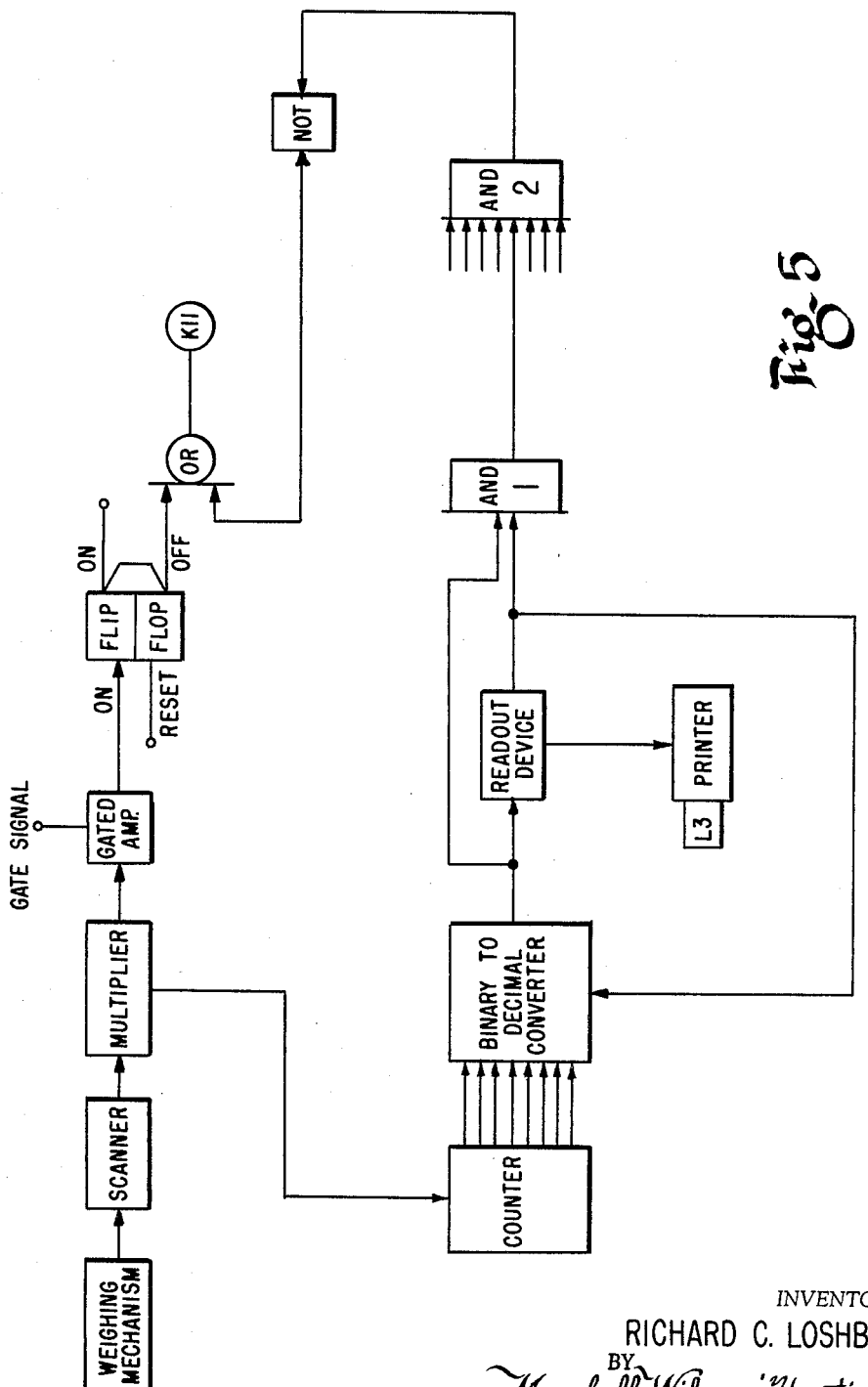

3,211,245
WEIGHING SCALE
Richard C. Loshbough, Toledo, Ohio, assignor to Toledo Scale Corporation, Toledo, Ohio, a corporation of Ohio
Filed Oct. 8, 1962, Ser. No. 229,105
11 Claims. (Cl. 177—3)

This invention relates to a weighing scale embodying a control system which operates to correct faulty results which have been found to arise from errors commonly made by human operators.

The invention is particularly applicable to a weighing scale of the type which is automatically operated by placing an article on the weighing platform and which automatically prints and issues a label showing the weight of the article. This type of weighing scale is widely used in large food stores or "super markets." The most modern of such scales also include a computer which can be set in accordance with the price per pound. Such a computer automatically computes the total value of the article, at the preset price per pound, and the label is printed to show not only the weight of the article but also the price per pound and the total value of the article.

This type of weighing scale is commonly constructed so that a printed label issued by the scale may fall (printed side down) on a heated plate. The back of such a label is ordinarily coated with a heat-activated adhesive, and the adhesive becomes tacky soon after the label falls on the heated plate. The article or package which has been weighed may then be pressed against the adhesive-coated back of the label as the label rests on the heated plate, causing the label to adhere to the article or package.

An operator using such a weighing scale can weigh and label approximately twenty-five to thirty packages per minute. Both hands of the operator are used in manipulating the articles or packages. The left hand is used to perform the operation of picking up the package from a conveyor or other source and placing the package on the weighing platform. While the left hand is being used to pick up each package from the conveyor or other source, the right hand is used simultaneously to pick up the previous package from the weighing platform, press it against the adhesive-coated back of the label which has been printed with the weight of the package and other data, and drop the labeled package into a chute or suitable receptacle.

An operator who uses such a weighing scale soon becomes skillful in handling the articles or packages. However, in the operation of such weighing scales, occasional irregularities occur which are liable to cause errors. Weighing scales have been provided heretofore with control systems designed to prevent errors from arising from irregularities in the operation of the scales, but substantial difficulties still exist which are not overcome by the known control systems.

One type of irregularity which occasionally occurs in the operation of such a scale is a "misfire" or faulty operation of the readout device that sets up the type to print the weight and value of the article on the label. Such faulty operation may be due to excessive wear or insufficient lubrication which can be corrected by servicing the scale. However, a single faulty operation should not require that the scale be shut down, and it is important to design the control system of the scale so that the scale can be kept in use in spite of an occasional faulty operation, and so that the operator will discard any incorrect label and will use a correct label on each article.

In the scales of this type heretofore known, the control systems have been designed to display an "error" light in the event that any of the printing type were set up incorrectly. These control systems also have been designed so that whenever this error light was displayed, the scale would not operate further until the operator pressed a "reset" button. The purpose of so designing the control systems was to call to the operator's attention the fact that a malfunction had occurred, by arresting the operation of the scale and requiring him to press a button in order to restore the scale to operation. Some of these scales have been designed to print no label in case of such a malfunction and some of them have been designed to print a defective label which was not issued from the scale until the operator pressed the reset button.

It has been found that the provision of an error light and a reset button in the scales of this type heretofore known has resulted in several important disadvantages. The presence of the error light and reset button indicates that the scale may function incorrectly and thus tends to arouse hostility in prospective purchasers. The user of the scale usually does not understand or remember the functions of the error light and the reset button because they are infrequently used. When the error light does appear, the operator is likely to cease operating the scale and to call a supervisor or serviceman. Even if the operator has enough self-confidence or experience so that he presses the reset button when the error light appears, he usually has a package in each hand and the confusion arising when he lays one package down and presses the reset button may cause him to get the packages out of step with the labels. If the operator gets the packages out of step, the label which he applies to each package is the label intended for the next succeeding package.

These difficulties are overcome by the weighing scale of the present invention, which embodies a new type of control system. The purpose of this new type of control system is to eliminate the necessity for a reset button, and to enable a malfunction to be corrected by an operation which is as simple and automatic as possible, so that the operator will compensate for the malfunction immediately and without confusion, and will continue operating the scale without getting the packages out of step with the labels.

It should be noted that it would not be safe to design the scale so that it automatically recycles in the event of such a malfunction, because in some cases the malfunction will be repeated every time the scale cycles. In such cases a scale that is designed to recycle automatically in the event of a malfunction would tend to recycle over and over so as to cause excessive wear or damage to the scale.

The control system of a scale embodying the present invention, upon detecting a malfunction of the type in question, does not automatically recycle the scale and does not require the scale to be reset, but interrupts the normal functioning of the scale and restores the scale to a condition in which it is ready to be actuated by placing an article on the weighing platform.

It has been found that the first action of this novel control system, i.e. interrupting the normal functioning of the apparatus, is necessary in order to call to the operator's attention the fact that a malfunction has occurred. The second action of this control system, after it detects a malfunction, is to restore the scale to a condition in which it is ready to be actuated by placing an article on the weighing platform. It has been found that when the interruption of the normal functioning of the scale forces the operator to pause, his natural impulse is to re-weigh the last package. When he does so, the scale having this novel control system is reactuated, and the operator immediately resumes the weighing and labeling of the successive packages.

The novel control system of a scale embodying the present invention provides a great improvement in operation. The step of re-weighing the last article is a normal one for the operator to perform when the apparatus "misfires" and the control system interrupts the normal functioning of the apparatus. Moreover, the fact that the present system requires the operator to re-weigh the last article insures that the operator will obtain a new printed label for the last article and will place that label on that article and not upon the next succeeding article. Thus the operator will not get the packages out of step with the labels and will affix each label to the package on which it belongs.

The principal object of the invention is to provide a weighing scale having an improved control system which insures that the scale will be operated in such a manner as to eliminate errors which have been found to occur in the operation of systems heretofore used.

More specific objects and advantages are apparent from the following description, in which reference is had to the accompanying drawings illustrating a preferred embodiment of the invention.

FIG. 5 is a block diagram showing a checking circuit which may be used in the weighing scale.

These specific drawings and the specific description that follows are intended to disclose and illustrate and not to limit the invention.

Construction of the basic weighing scale

In order to simplify the present description, the details of the basic weighing scale to which the present improvements are applied will not be described, and reference is made to U.S. Patent No. 3,163,247 for a detailed description of a basic weighing, computing and printing scale and control system to which these improvements may be applied.

Figure 1:
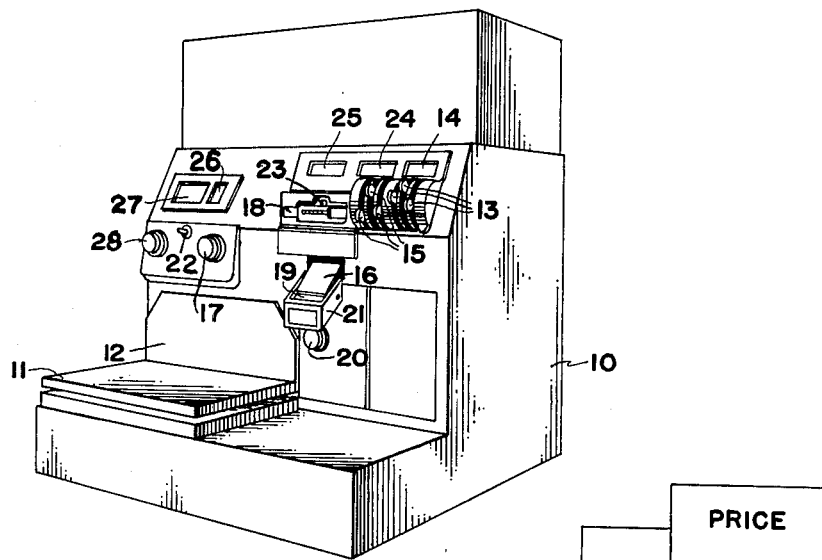
FIG. 1 is a perspective view of a weighing scale embodying the invention.

An apparatus embodying the present invention may be housed in a casing 10 as shown in FIG. 1. The casing 10 contains a weighing mechanism which supports a weighing platform 1 upon which the operator places an article or package to be weighed. This weighing platform and a flange 12 which extends upward from the rear edge of the weighing platform are spaced from the casing 10 so that the weighing platform is free to move with the supporting weighing mechanism which extends below the weighing platform.

As shown in FIG. 1 the apparatus is provided with three handles 13 which the operator sets in accordance with the price per pound of the commodity that is to be weighed. These three handles are connected to number wheels that exhibit the price in the window 14 in three decimal places. Three additional handles 15 are used to set code numbers which can be printed on the label to indicate the date or other information.

Figure 2:
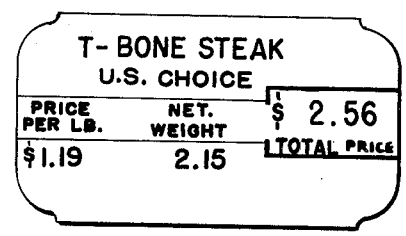
FIG. 2 is an elevation of a label of the type which may be printed by the weighing scale.

Under ordinary operating conditions, the mere placing of an article or package upon the weighing platform 11 causes the apparatus to operate automatically to weigh the package and issue a printed label which slides down the chute 16. The printed label, as illustrated in FIG. 2, shows the price per pound, the net weight of the commodity and the total computed price of the package. In order that the scale may be used to determine the net weight rather than the gross weight of a package, a tare knob 17 is provided. In the use of this tare knob, an empty package is placed upon the weighing platform 11 and the tare knob 17 is used to reset the ewighing mechanism so that it shows zero weight with an empty package on the weighing platform. In this manner the weighing mechanism is set to subtract the empty weight of the package or container, so that for each similar package that is subsequently placed upon the weighing platform the scale will indicate the net weight of the commodity in the package.

A description of the commodity may be printed at the top of the label as indicated in FIG. 2. This commodity description is printed from type carried by a removable frame 18 which may be replaced by another frame carrying different type whenever a different commodity is to be weighed.

Each of the labels is issued printed side down and slides from the chute 16 onto a surface 19 which may be heated by suitable electrical heating elements. A rheostat controlled by a knob 20 is provided to control the electrical heating elements so as to determine the temperature of the heated surface 19. The back of each label is coated with an adhesive which becomes tacky when the label is heated. The heated surface 19 is surrounded by a pivoted frame 21. The operator, in order to affix the label to the package, takes the package from the weighing platform 11 and presses it downward upon the pivoted frame 21 until the package comes into firm contact with the tacky adhesive coating on the back of the label. When this is done, the label adheres firmly to the package so that when the package is lifted from the pivoted frame 21 the label has been properly attached to the package.

The weight determined by the weighing mechanism is read photoelectrically and transmitted to a computer in which the weight is multipled by the price per unit of weight. To this end, the weighing mechanism is provided with a shutter which is positioned precisely by the weighing mechanism in accordance with the weight of the commodity. This shutter is located in front of a transparent stationary chart which is ruled with closely spaced opaque lines. In each position of the shutter, it exposes a portion of the stationary ruled chart, and this exposed portion contains a number of lines proportional to the weight which has been determined by the weighing mechanism. In a typical case, when a commodity weighing 1.50 pounds is placed on the weighing platform 11, the weighing mechanism comes to rest in a position in which the shutter exposes 150 lines on the stationary ruled chart. If the commodity weighs 1.75 pounds, the weighing mechanism comes to rest in a position in which the shutter exposes 175 lines on the stationary ruled chart.

The weight indicated by the number of lines on the stationary ruled chart which are exposed by the shutter may be read photoelectrically by means of a scanner which traverses the entire stationary ruled chart and then returns to its home position. The scanner carries a light source for projecting a beam of light and a photocell upon which the beam of light is focused. As the scanner moves from its home position across the portion of the stationary ruled chart that is exposed by the shutter, each exposed line that is crossed by the beam interrupts the light so as to generate an electrical pulse in the photocell.

Operation of the basic weighing scale

Figure 3:
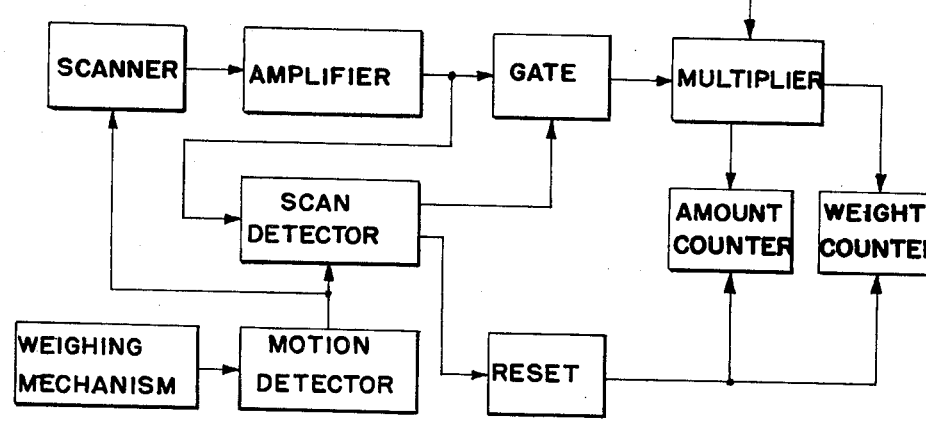
FIG. 3 is a diagram illustrating the relationship of components that may be used in the weighing scale.

The operation of the basic weighing scale to which the present improvements may be applied is illustrated in FIG. 3. The train of electrical pulses from the scanner is passed through an amplifier and a gate into an electrical multiplier. The number of pulses thus produced by the scanner is a measure of the weight of the commodity, and this same number of pulses is transmitted from the multiplier to an electronic weight counter, so as to set the weight counter in accordance with the weight of the commodity.

In order to condition the electronic circuits just before the scanner generates a train of pulses that represents the weight of an article, the scanner is designed to generate one preliminary pulse just ahead of each train of pulses representing the weight. This preliminary pulse is used to actuate a scan detector that has two functions. One function of the scan detector is to open an electronic gate through which the train of pulses representing weight will pass to the multiplier. Another function resets the detector is to actuate a resetting circuit which resets the electronic counters to zero so that they are ready to count pulses subsequently received from the multiplier.

Before the weighing operation begins, the multiplier has been set in accordance with the price per pound of the commodity, by means of the knobs 13. Upon receiving the train of pulses representing the weight of the commodity, the multiplier transmits pulses to an amount counter so as to set the amount counter in accordance with a value which is the product of the weight in pounds times the price per pound.

An electronic motion detector is also used to determine whether or not the weighing mechanism is at rest. After a package has been placed upon the weighing platform 11, the cessation of the motion of the weighing mechanism is detected by the motion detector, which then causes the scanner to begin its scan. The motion detector also conditions the scan detector to be actuated by the preliminary pulse which is generated by the scanner.

Figure 4:
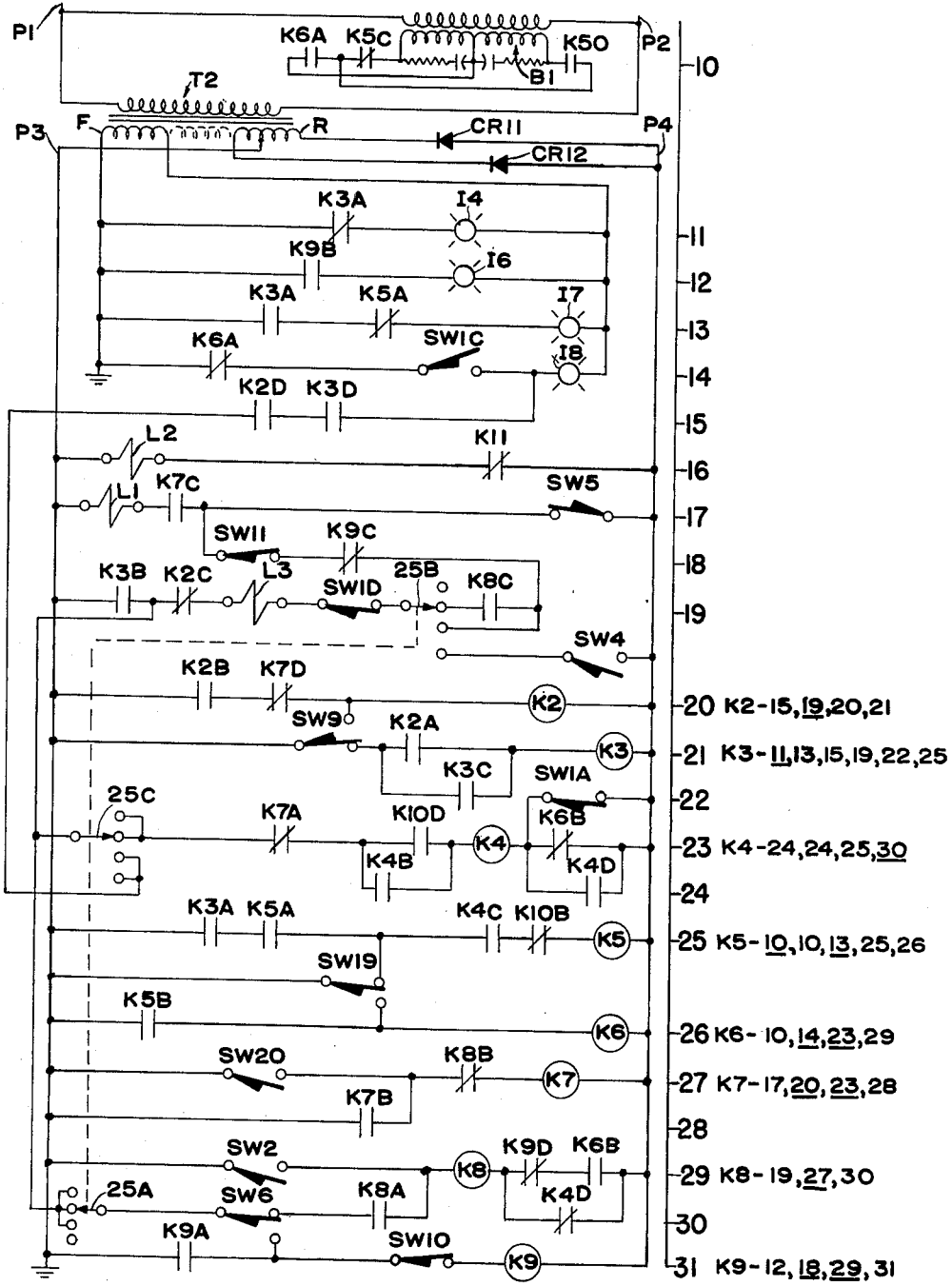
FIG. 4 is a wiring diagram of a preferred type of control system for use in a weighing scale embodying the invention.

FIG. 4 is an across-the-line diagram of a master control circuit which may be used in an apparatus embodying the invention.

The circuit shown in FIG. 4 is designed for use with a weighing scale as shown in FIG. 1 that is equipped with interlocking mechanism which normally locks the price-setting knobs 13 in the positions in which they have been set. Removal of the printing plate held by the frame 18 releases a locking slide to unlock the price-setting knobs 13 so that they can be moved to new positions. Then after reinsertion of a printing plate, for printing the name of the commodity on the label, the apparatus cannot be operated unit a handle 23 is moved to the right in order to restore the locking slide to its normal locking position.

However, the interlocking mechanism is constructed so that once the locking slide has been released by removing the printing plate held by the frame 18, the locking slide cannot be restored to its normal position until at least one of the price-setting knobs 13 has been moved. Thus the net effect of the interlocking mechanism is to keep the price-setting knobs 13 locked while the apparatus is in operating condition, to require that the printing plate be removed before the knobs 13 can be moved, and to require that at least one of the knobs 13 be moved after removal of the printing plate, before the locking slide can be restored to its normal position to place the apparatus in operating condition.

In the key along the right margin of FIG. 4 each line is numbered to assist in locating the contacts operated by each relay coil. The symbol of each relay coil is listed in the margin opposite the line in which the coil appears and is followed by the number of each line in which contacts operated by that coil are found. In any case in which the line number is underlined, the contacts located in that line are back contacts, i.e. are closed when the relay is deenergized.

Upon the closing of the main power switch 22 shown in FIG. 1, alternating current is supplied to the power lines P1 and P2 and flows through the primary winding of the transformer T2. This transformer is provided with two secondary windings F and R, and a center tap of the secondary winding R is connected to a grounded power line P3 of the relay circuit. Each end of the secondary winding R is connected through rectifiers CR11 and CR12 to the other power line P4 of the relay circuit.

At this time the contacts K3A in line 11 are closed because the relay K3 has not yet been energized, so that current is supplied through these contacts from the secondary winding F to illuminate the "set name, price and lock" lamp 14.

In FIG. 4 the interlock slide switch SW9, which is operated by the locking slide, is shown in the position that it occupies when the slide is in its normal locking position. Whenever the locking slide is released by removing the printing plate, this switch moves to its other position so as to complete a circuit from line P3 through the relay K2 to line P4. When the relay K2 is thus energized, it closes its front contacts K2B in line 20 to complete a holding circuit for this relay through the contacts K7D. The latter contacts are closed at this time because the relay K7 has not yet been energized.

The energizing of the relay K2 also closes its front contacts K2A in line 21. Then when the locking slide is returned to its normal locking position, the interlock slide switch SW9 is returned to the position shown in FIG. 4. Thus a circuit is completed through this switch and through the closed contacts K2A to energize the relay K3, which then closes its front contacts K3C in line 22 and opens its back contacts K3A in line 11. The opening of the contacts K3A extinguishes the "set name, price and lock" lamp 14.

The energization of the relay K3 also closes its front contacts K3A in line 13 to complete a circuit through the contacts K5A to illuminate the "ready" lamp 17. The latter contacts are closed at this time because the relay K5A has not yet been energized. The illumination of the ready lamp signals the operator that the apparatus is ready to be actuated by placing an article on the weighing platform 11.

It will be evident that before the relay K3 can be energized, the relay K2 must be energized by releasing the locking slide. This insures that after the apparatus has been shut down by turning off the main power switch, it will always be necessary to release the locking slide before the apparatus can be placed in operating condition. Turning off the main power supply always deenergizes the relays K2 and K3, and the relay K3 cannot be reenergized until the locking slide has been released to energize the relay K2. The locking slide can only be released by removing the printing plate, and it cannot be restored to its normal position to place the machine in operation until at least one of the price-setting knobs 13 has been moved. The operator cannot forget to reset the price knobs and change the printing plate when he turns on the main power switch 22, because it is necessary that he release and then restore the locking slide in order to energize the relays K2 and K3 after the power has been turned on. The apparatus will not operate until the relay K3 has been energized. Once the relay K3 has been energized, it remains energized until the locking slide is released or until the power is turned off.

The circuit shown in FIG. 4 is designed for use with a weighing scale having a motion detector of the type disclosed in U.S. Patent No. 3,130,802. This type of motion detector operates a relay in such a manner that the relay is energized while the weighing mechanism supporting the weighing platform 11 is in motion and remains energized until the weighing mechanism comes to rest with a load on the platform that is within the weighing capaicty of the scale. So long as the weighing platform 11 is empty or contains a load in excess of the weighing capacity of the scale, this motion detector relay remains energized, as it does while the weighing mechanism is in motion.

The energizing of the motion detector relay closes its front contacts K10D in line 23 to complete a circuit for energizing the relay K4. This circuit includes the front contacts K3B in line 19, which have been closed by the energizing of the relay K3, and also includes the back contacts K7A, which are closed because the relay K7 has not yet been energized, and includes the "sensing bar home" switch SW1A which is closed at this time. When the relay K4 is thus energized, it closes its front contacts K4B and K4D in line 24.

The deenergizing of the motion detector relay, which occurs when the weighing mechanism comes to rest with an article on the weighing platform 11, closes the back contacts K10B of that relay in line 25 and thus completes a circuit to energize the relay K5. This circuit includes the scanner home switch SW19, which is closed at this time, and also includes the front contacts K4C which have been closed by the energizing of the relay K4.

A weighing and computing cycle can be started only by energizing the motion detector relay. That relay is only energized when the weighing mechanism is in motion or when the weighing platform 11 is empty or contains a load in excess of the weighing capacity of the scale. Thus a weighing and computing cycle may be started by emptying the weighing platform 11 or by disturbing the weighing platform to place the weighing mechanism in motion. The weighing platform may be disturbed to place the weighing mechanism in motion either by the act of depositing an article upon the empty weighing platform or by the act of removing an article from the weighing platform and replacing it with another article.

Although a weighing and computing cycle is started by thus energizing the motion detector relay to close its contacts K10D so as to energize the relay K4, the cycle cannot proceed until the motion detector relay has been deenergized to close its contacts K10B so as to energize the relay K5. Deenergization of the motion detector relay occurs only when the weighing mechanism comes to rest with a load on the weighing platform 11 that is within the weighing capacity of the scale.

The energizing of the relay K5 closes its front contacts K5A in line 25, and also opens its back contacts K5A in line 13 to turn off the ready lamp I7. At the same time the front contacts K5B of this relay in line 26 are closed to energize the relay K6.

Energization of the relay K6 closes its front contacts K6A in line 10 to complete a circuit through one of the shading coils of the shaded pole motor B1 which drives the scanner. The previous energization of the relay K5 has opened its back contacts K5C and closed its front contacts K5O in line 10. These two pairs of contacts of the relay K5 are used to determine which one of the two shading coils of the motor B1 will be in the circuit that is completed by the closing of the front contacts K6A of the relay K6 and thus to determine the direction in which the motor B1 drives the scanner. So long as the relay K5 is energized, the contacts K5O are closed and the motor B1 drives the scanner forward from its home position.

As the motor B1 drives the scanner forward while the relays K5 and K6 are energized, the scanner generates a train of pulses representing the weight of the article on the weighing platform 11, as hereinbefore described. The scanner home switch SW19 is mechanically operated by the scanner, and occupies the position shown in FIG. 4 only when the scanner is in its home position. Thus as the scanner leaves its home position the scanner home switch SW19 moves to its lower position in which it completes a holding circuit for the relay K6.

When the scanner reaches its "out" position and is ready to be reversed and returned to its home position, the generation of the train of pulses representing the weight of the commodity has been completed, the computation of the value of the commodity has been completed and the two counters have been set in accordance with the weight of the commodity and its computed value.

When the scanner reaches its out position, it closes the scanner out switch SW20 to energize the relay K7 through a circuit including the back contacts K8B. Those back contacts are closed at this time because the relay K8 has not yet been energized. The energization of the relay K7 opens its back contacts K7D in line 20 and K7A in line 23 to deenergize the relays K2 and K4, and closes its front contacts K7B in line 28 to complete a holding circuit for the relay K7.

The energizing of the relay K7 also closes its front contacts K7C in line 17 so as to complete a circuit for energizing the wheel release solenoid L1 through the "carriage home switch" SW5 which is closed at this time. Energization of the wheel release solenoid initiates the operation of the readout mechanism that sets the type wheels for printing weight in accordance with the setting of the electronic weight counter and sets the type wheels for printing value in accordance with the setting of the electronic amount counter. At this same time this readout mechanism sets indicating wheels which show the weight in the window 24 and show the value in the window 25 in FIG. 1.

Another window 26 may be used to show a second indication of the weight which is produced directly by the weighing mechanism. Adjacent to the window 26 is a larger window 27 in which the various illuminated signals are exhibited. The window 27 is in effect a screen behind which are arranged several signs which are visible only when they are illuminated. One of these signs consists of the words "set name, price and lock," and this sign is visible only when the lamp I4 is illuminated. Another of these signs consists of the word "ready" and is visible only when the ready lamp I7 is illuminated. Preferably each of the signs is lettered on transparent material of a different color so that the operator can recognize each signal distinctively by its color.

When the K4 relay is deenergized by the opening of the contacts K7A in line 23, its front contacts K4C in line 25 open to deenergize the K5 relay. Deenergization of this relay opens its back contacts K5C and closes its front contacts K5O in line 10. This reverses the motor B1 so that the scanner ceases its forward movement and begins to move backward toward its home position.

As the readout mechanism proceeds to operate after energization of the wheel release solenoid L1, it closes the "sensing bar out" switch SW2 to energize the relay K8 through a circuit that includes the back contacts K4D which were closed when the relay K4 was deenergized. Energization of the relay K8 closes its front contacts K8A to complete a holding circuit through the carriage home switch SW6, and opens its back contacts K8B in line 27 to deenergize the relay K7.

After the readout mechanism has operated to set the type wheels, an electrical checking circuit operates to determine whether or not the positions of the type wheels are in accordance with the settings of the electronic counters. A suitable electrical checking circuit is shown in FIG. 5. The left hand portion of FIG. 5 is a simplified version of FIG. 3. The weighing mechanism and the scanner are connected to feed a series of electrical pulses, proportional in number to the weight, into the multiplier. The multiplier has two output connections, the first of which goes through a gated amplifier to the "ON" input of a flip flop. The second output of the multiplier is connected to the input of the counter. The output of the counter is connected through a binary to decimal converter to a readout device. The output of the binary to decimal converter, which may be a matrix or other strictly electronic device, may be connected to an input of a first AND logic circuit. The output, or a sample of the output, of the readout device is connected to a second input of the first AND logic circuit. In the preferred embodiment the binary to decimal converter is of the electro-mechanical type, and a feedback from the output of the readout device may be connected back to the binary to decimal converter in order to activate a latch circuit of the converter which will bring the binary to decimal converter and the readout device to stop on indicia corresponding to a count in the counter. The output of the first AND logic circuit is connected to an input of a second AND logic circuit. The second AND logic circuit has as many inputs as there are previous readout circuits.

The output of the second AND logic circuit is connected to the input of a NOT logic circuit. The "OFF" output of the flip flop is connected to the input of an OR logic circuit. The output of the NOT logic circuit is connected to the other input of the OR logic circuit, and the output of the OR logic circuit is connected to energize the checking relay K11.

In the operation of the circuit shown in FIG. 5, the flip flop is initially in the OFF condition. When at least one pulse or a series of pulses generated from the scanner passes through the multiplier and the gated amplifier, an "ON" input signal is supplied to the flip flop.

The entire series of pulses from the scanner is counted by the counter or is computed by the combination of the multiplier and the counter. The resultant count in the counter is fed through the binary to decimal converter to the readout device. The readout device in turn is used to set type of a printer in accordance with the count stored in the counter.

It is desired to sense the coincidence of the indicia shown by the readout device as corresponding to the count, stored in the counter, which has been fed through the converter to the readout device. This is accomplished by sampling the outputs of the binary to decimal converter and electrically sensing the mechanical position of the readout device. When these two outputs coincide and are applied to the inputs of the first AND logic circuit, the AND logic circuit will produce an output to the input of the second AND logic circuit.

If there are a plurality of readout devices such as the one just described it may be seen that the plurality of output signals of these readout devices must be applied to a like plurality of inputs of the second AND logic circuit in order to cause the second AND logic circuit to produce an output signal. Assuming that there are no failures in the electronic portion of the apparatus and assuming proper positioning of the readout devices, there is no output from the "OFF" output of the flip flop, but there is an output from the second AND logic circuit 750. In response to the coincidence of an output signal from the second AND logic circuit and no output signal from the flip flop, the relay K11 is deenergized.

Actually, the checking relay K11 is maintained in an energized state by an output signal from the NOT logic circuit or an output signal from the "OFF" output of the flip flop, through an OR logic circuit. By definition, the NOT logic circuit produces an output signal only so long as it is receiving no input signal. Thus when all of the readout devices are properly positioned, causing the second AND logic circuit to receive the required number of input signals, this second AND logic circuit produces its output signal and the NOT logic circuit produces no output signal. Even under those circumstances, the checking relay K11 will remain energized through the OR logic circuit if the flip flop is producing an output signal from its "OFF" output terminal. However, when there are no failures in the electronic portion of the apparatus, the transmission of the pulses from the multiplier has placed the flip flop in its ON condition, so that there is no output from the "OFF" terminal of the flip flop. At the same time, the output signal from the second AND logic circuit causes the output from the NOT logic circuit to cease. Then with both inputs cut off from the OR logic circuit, the checking relay K11 is deenergized. When the electrical checking relay K11 is deenergized, it closes its back contacts K11 in line 16, thus completing a circuit to energize the mechanical check solenoid L2. Energization of this solenoid releases a sensing bar, and the sensing bar when released can return to its home position only in the event that all of the type wheels have been latched and locked in position by the readout mechanism. When the sensing bar reaches its home position, the "sensing bar home" switch SW1D closes to complete a circuit to energize the print solenoid L3 so as to initiate the printing operation. This circuit is completed through the closed front contacts K3B of the relay K3, the closed back contacts K2C of the relay K2, the closed front contacts K8C of the relay K8, the closed back contacts K9C of the relay K9, the "take label" switch SW11 and the carriage home switch SW5.

As the printing operation proceeds, the carriage home switch switch SW5 opens to deenergize the print solenoid and the carriage home switch SK6 moves to its lower position to deenergize the relay K8 and energize the relay K9. The circuit through which the relay K9 is energized includes the closed front contacts K3B in line 19 and the take label switch SW10. Energization of the relay K9 closes its front contacts K9A to complete a holding circuit extending directly from the grounded power line P3.

Both of the take label switches are actuated by the movement of the pivoted frame 21. This movement occurs when an operator presses a package downward upon the frame in order to bring the package into contact with the tacky adhesive coating on the back of a printed label which is resting printed side down on the heated surface 19. These two switches are so arranged so that as the pivoted frame 21 moves downward the take label switch SW11 opens first and the take label switch SW10 opens second. Then as the operator removes the package with the adhering label, the pivoted frame 21 is moved upward to its home position by a spring. During this upward movement the switch SW10 closes first and the switch SW11 closes second. This sequence of operation of the two switches insures that the circuit for the print solenoid L3 will be broken by the opening of the switch SW11 before the adjacent contacts K9C are closed by the deenergization of the relay K9 which occurs with the opening of the switch SW10. Thus the circuit to energize the print solenoid is not completed until the switch SW11 finally closes as the pivoted frame 21 moves upward while the package is being removed therefrom. This arrangement insures that the printing operation will not be initiated until the package is removed from the pivoted frame and thus insures that the next printed label will not be issued onto the chute 19 until the package with the previous label adhering thereto has been lifted out of the way.

The operation of this system to print a label for a package begins when the weighing mechanism comes to rest with the package on the weighing platform 11. When that occurs the motion detector relay becomes deenergized to close its back contacts K10B in line 25 and to open its front contacts K10D in line 23. This energizes the relay K5, but the relay K4, which is the preceding relay in the sequence, remains energized through its holding circuit which includes the front contacts K4B in line 24.

Energization of the relay K5 always energizes the relay K6 through the front contacts K5B in line 26, and the front contacts K6A in line 10 cause the scanner motor to run all during the time when the relay K6 is energized. Moreover, the "scanner home" switch SW19 is in its lower position all during the time when this scanner is away from its home position, to complete a holding circuit for the relay K6. Once the scanner leaves its home position, the relay K6 cannot become deenergized until the scanner returns to its home position so that the scanner motor does not stop running until the scanner returns to its home position.

When the scanner reaches its out position the "scanner out" switch SW20 closes to energize the relay K7, and when energized this relay seals itself in through its front contacts K7B and remains sealed in until the back contacts K8B are opened by energization of the relay K8. The operation of the readout mechanism begins with the energization of the relay K7, provided that the previous printing operation has been completed to return the carriage home switch SW5 to the normal or home position in which it is shown in FIG. 4. The readout operation is initiated by energization of the wheel release solenoid L1, which occurs as soon as the relay K7 is energized and the carriage home switch SW5 is closed.

Then during the course of the readout operation the relay K8 is energized by momentary closure of the sensing bar out switch SW2. When so energized, the relay K8 establishes its own holding circuit through its front contacts K8A. This holding circuit is broken to deenergize the relay K8 when the printing operation is initiated to move the carriage home switch SW6 to its lower position.

Movement of the carriage home switch SW6 to its lower position upon initiation of the printing operation also energizes the relay K9, and when so energized this relay establishes its own holding circuit through its front contacts K9A. This holding circuit can be broken only by the opening of the take label switch SW10 which occurs while the printed label is being affixed to a package and removed. So long as the relay K9 remains energized by its holding circuit, its back contacts K9C in line 18 remain opened, so that a subsequent label cannot be printed until the preceding label has been removed from the heated surface 19.

The total amount of time which elapses from the placing of a package on the weighing platform 11 until the deposition of a printed label on the heated surface 19 is approximately 3 seconds. This period of time includes approximately ½ second for the weighing mechanism to come to rest, 1 second for the scanner to complete its forward stroke, ½ second for the readout and checking operations in which the type wheels are set and locked and 1 second for printing the label and adhering it to the heated surface.

If the platform is disturbed during the forward stroke of the scanner, the resulting motion of the weighing mechanism instantly energizes the motion detector relay to open its back contacts K10B in line 25 and deenergize the relay K5. Such deenergization of the relay K5 closes its back contacts K5C and opens its front contacts K5O in line 10 so as to reverse the direction of rotation of the scanner motor B1. Thus any disturbance of the weighing mechanism during the forward motion of the scanner, such as a disturbance caused by the operator touching the weighing platform 11 or the article on the platform, causes the scanner to reverse instantly and return to its home position.

Whenever the scanner is thus reversed during its forward motion by deenergization of the relay K5, the holding circuit for the relay K5 has been broken by the opening of its front contacts K5A, so that the relay K5 cannot be reenergized until the scanner reaches its home position. Thus the backward movement of the scanner always continues until the scanner reaches its home position, where it moves the scanner home switch SW19 to its upper position shown in FIG. 4. As soon as the scanner home switch SW19 has reached its upper position and the weighing mechanism has again come to rest, a circuit to energize the relay K5 is again completed and the scanner moves forward to start the cycle over again.

Once the cycle has been started by energization of the relay K5 when the weighing mechanism comes to rest with an article on the weighing platform, any disturbance of the weighing mechanism during the forward movement of the scanner will cause the scanner to return to its home position, but a new cycle will then begin automatically as soon as the weighing mechanism comes to rest.

The relay K7 is energized by closure of the scanner out switch SW20 when the scanner reaches its out position and the electronic counters have been set in accordance with the weight and value of the commodity. The initiation of the readout operation by energization of the wheel release solenoid L1 follows very shortly after energization of the relay K7. During the readout operation the relay K8 is energized by closure of the sensing bar out switch SW2, and upon energization the relay K8 opens its back contacts K8B in line 27 to deenergize the relay K7.

As soon as the readout and checking operations have been completed, a circuit for energizing the relay K4 to start a new weighing cycle can be completed upon closure of the front contacts K10D by energization of the motion detector relay. Thus after completion of the readout and checking operations the relay K4 can be reenergized by disturbing the weighing mechanism, for example by removing the article previously weighed and replacing it with another article. It will be understood that the ready light I7 is illuminated at the end of the forward stroke of the scanner, when the scanner out switch SW20 is closed to energize the relay K7 and to open its back contacts K7A in line 23. The opening of the back contacts K7A deenergizes the relay K4, which in turn opens its front contacts K4C in line 25 to deenergize the relay K5 and close its back contacts K5A in the ready light circuit.

It will be observed that this system provides a holding point at the end of the readout and checking operations. At this point the relay K8 has been energized by the closure of the sensing bar out switch SW2 which occurred during the readout operation. If at this point the preceding label has been removed from the heated surface 19, so that the relay K9 is deenergized, the deenergized condition of the relay K9 will permit the printing operation to proceed immediately. That is true because the back contacts K9C in line 18 will be closed, the front contacts K8C in line 19 will be closed and the print solenoid L3 will be energized as soon as the readout and checking operations have been completed to close the sensing bar home switch SW1D.

If at this holding point, at the end of the readout and checking operations, the relay K9 is still energized, indicating that the preceding label is still resting on the heated surface 19, the open back contacts K9C in line 18 prevent the printing operation from proceeding. At the same time, the closed front contacts K9D of the relay K9, which are located in line 12, complete a circuit to illuminate the "take label" lamp I6. This lamp illuminates a sign consisting of the words "take label" in the window 27, to inform the operator that the label must be taken by applying it to a package before another label can be printed.

This point, at the end of the readout and checking operations, is also the point at which it becomes possible to start a new weighing cycle by disturbing the weighing mechanism so as to energize the motion detector relay and thereby energize the relay K4. Thus if the relay K9 is energized at this point, a hold occurs until the relay K9 is deenergized or the relay K4 is energized. If the relay K9 is deenergized first, the printing operation proceeds. On the other hand, if the relay K4 is energized first, its back contacts K4D in line 30 open to deenergize the relay K8. The energization of the relay K4 also starts a new scanning cycle which is followed by a new readout cycle to reset the type wheels of the printer. If such a new cycle occurs before the preceding cycle has proceeded to the printing stage, the relay K9 remains energized and is not recycled with the other relays. The relay K9 can be deenergized only by the opening of the take label switch SW10 that occurs when the previously printed label is being removed from the heated surface 19.

Whenever the printing plate is removed to release the locking slide, the interlock slide switch SW9 moves to its upper position to deenergize the relay K3. Whenever the relay K3 is thus deenergized, it opens its front contacts K3B in line 19 to deenergize the relay K4, to break the holding circuit for the relay K8 and to prevent the print solenoid L3 from being energized. At the same time, the deenergization of the relay K3 opens its front contacts K3A in line 25 to break the holding circuit for the relay K5, and closes its back contacts K3A in line 11 to complete a circuit for illuminating the "set name, price and lock" lamp 14.

Thus if the printing plate is removed during the forward movement of the scanner, the deenergization of the relay K5 causes the scanner to reverse and return to its home position. If the printing plate is removed during the readout and checking operations, while the scanner is returning to its home position, the relay K8 will be energized momentarily while the sensing bar is in its out position, but the holding circuit for the relay K8 will not be completed so that the relay K8 will be immediately deenergized. In either case, the removal of the printing plate will restore the system to the starting condition which existed when the main power switch was first turned on, except that the relay K9 will remain energized if a label has been printed and has not been removed from the heated surface 19.

The point at the end of the readout and checking operations at which it is possible to start a new weighing cycle to weight an article that has just been placed on the weighing platform is approximately 2 seconds after the beginning of the previous cycle. As a practical matter, each article or package can be placed on the weighing platform as soon as the ready light I7 is illuminated to indicate that the scanner has started moving backward toward its home position. Then by the time the scanner reaches its home position the weighing mechanism will have come to rest, so that a new cycle starts instantly when the scanner reaches its home position. The scanner completes its forward and backward motion in about 2 seconds, so that the effective speed of operation of the apparatus is 2 seconds per package.

FIG. 4 shows the printer mode switches SW25A, SW25B and SW25C in their No. 2 positions in which the apparatus operates in the normal manner as hereinbefore described. These three switches are ganged so that all three of the switches always occupy the same numbered position.

When these three switches are in their No. 1 positions, the SW25B switch is open and the other two switches make the same connections as in their No. 2 positions. Thus when the three switches are in their No. 1 positions, the apparatus operates in the manner hereinbefore described except that the print solenoid L3 cannot be energized and therefore no printing operation can take place. In this No. 1 mode of operation, the carriage home switch SW6 never leaves the position shown in FIG. 4, so that the relay K9 is never energized, and the relay K8, after being energized, remains energized until its holding circuit is broken by energization of the relay K4.

Before the three printer mode switches are placed in their No. 3 positions, the apparatus must be cycled with the three switches in their No. 2 positions to weigh an article and print a label. If the three printer mode switches are then placed in their No. 3 postions, the type wheels will remain locked. At the same time the front contacts K8C of the relay K8 will be shunted out of the circuit for energizing the print solenoid. Thus the printer can be operated independently of the remainder of the apparatus by means of the pivoted frame 21. Each time a printed label is taken by pressing a package upon the pivoted frame 21 and then removing the package, the relay K9 will be deenergized to complete the circuit to the print solenoid L3, thus initiating a printing operation to print a duplicate ticket and to reenergize the relay K9.

If the three printer mode switches are moved to their No. 4 positions after the machine has been cycled to weigh an article and print a label, the relay K9 cannot be reenergized after it has been deenergized by pressing a package upon the pivoted frame 21 to take the first label. As soon as the first label has been taken, the printer will continue to be reactuated by the repeat print switch SW4 which is automatically closed by a timer at intervals of about 0.75 second.

Control system improvements

The control system shown in FIG. 4 embodies means for detecting an error in the data incorporating a weight factor which is exhibited in the windows 24 and 25 by the indicating wheels that are set by the readout mechanism. Thus the back contacts K11 in line 16 will not close unless the electrical checking circuit determines that the positions of the wheels are in accordance with the settings of the electronic counters and deenergizes the electrical checking relay to close its back contacts K11. If the contacts K11 are not closed during the checking operation that follows the readout operation, the mechanical check solenoid L2 will not be energized to release the sensing bar, and the sensing bar then cannot return to its home position. Even when the contacts K11 do close to energize the mechanical check solenoid L2 and release the sensing bar, the sensing bar then does not return to its home position unless it mechanically senses that all of the readout wheels have been latched and locked.

In accordance with the present invention, the control system shown in FIG. 4 embodies means actuated by the error detecting means for interrupting the normal functioning of the apparatus. Thus if the sensing bar fails to return to its home position, the sensing bar home switch SW1D remains open to prevent the print solenoid L3 from being energized, and the sensing bar home switch SW1A also remains open at the end of the readout and checking operations.

However, at the beginning of the readout and checking operations the scanner is reversed and begins to move backward toward its home position and the ready lamp I7 is illuminated. As soon as the ready lamp is illuminated, the operator in accordance with his normal procedure takes the package off the weighing platform with his right hand and places a new package on the platform with his left hand. If the sensing bar fails to return to its home position at the end of the checking operation, so that the print solenoid L3 is not energized, no label is printed and the operator is left holding a package in his right hand when no printed label is delivered to the heated surface 19.

During normal operation, when the operator places a new package on the weighing platform after the ready lamp has been illuminated, the relay K4 becomes energized and then the weighing mechanism comes to rest while the scanner is returning to its home position. Then when the scanner reaches its home position the scanner home switch SW19 moves to the upper position shown in FIG. 4 to energize the relay K5 and start a new cycle.

However, when the sensing bar fails to return to its home position during the checking operation, the sensing bar home switch SW1A fails to close at the end of the checking operation, although the ready lamp I7 is illuminated as usual at the beginning of the readout and checking operations. Then when the operator, in response to the illumination of the ready lamp, places a new package on the weighing platform during the return movement of the scanner, the open condition of the sensing bar home switch SW1A prevents the relay K4 from being energized in the normal manner during the return movement of the scanner after a new package has been placed upon the weighing platform.

Thus in the operation of the present control system the failure of the sensing bar to return to its home position and close its home switches SW1D and SW1A not only leaves the operator holding a package in his right hand by preventing the printing of a label for that package, but also prevents a new cycle from being started by the placing of a new package on the weighing platform during the return movement of the scanner.

The present apparatus, however, also comprises means for restoring the apparatus to a condition in which it is ready to be actuated by placing an article on the weighing platform. Thus the relay K6 has a set of back contacts K6B in parallel with the sensing bar home switch SW1A. As soon as the scanner returns to its home position to move the scanner home switch SW19 to its upper position as shown in FIG. 4, these back contacts K6B are closed by deenergization of the relay K6.

In the practice of the present invention, therefore, when the failure of the sensing bar to return to its home position at the end of the checking operation leaves the operator holding the last package in his right hand, with the next package resting on the weighing platform, the operator only needs to remove the next package from the weighing platform and replace it with the package that he is holding in his right hand. When he does so, the apparatus will resume its normal operation and the operator can proceed to handle the packages in the normal manner. It has been found that it is natural for the operator to proceed in this manner, and that the present invention obviates the confusion which occurred because of the provision of the error light and the reset button in the apparatus heretofore known.

The present control system provides a pair of front contacts K4D of the relay K4 in parallel with the back contacts K6B of the relay K6. The front contacts K4D provide a holding circuit so that when the operator removes the next package from the weighing platform and replaces it with the package that he is holding in his right hand, a new cycle may proceed and the energizing circuit for the relay K4 will not be broken when the relay K6 is energized even though the sensing bar home switch is still open at this point. In the present control system, also in order that such a new cycle may proceed, the relay K6 has a pair of front contacts K6B in line 29. The opening of these front contacts when the scanner reaches its home position causes the relay K8 to be deenergized in preparation for a new cycle as soon as the relay K4 is energized to open its back contacts K4D in line 30.

Another error that is detected by the present control system is the error that occurs when the operator changes the printing plate and resets the knobs 13 while the printer mode switches are in their No. 3 or No. 4 positions. This results in an error because the operator should have reweighed one package after making such a change in order to reset the type wheels to a value computed at the new price.

If the operator removes the printing plate while the printer mode switches are in their No. 3 or No. 4 positions, the operation of restoring the locking slide to its normal position will leave both the relay K2 and the relay K3 energized as hereinbefore described. Thus the back contacts K2C in line 19 will be open to prevent further energization of the print solenoid L3. Thus it will be necessary that the operator place the printer mode switches in their No. 2 positions and weigh one package, and thereafter he can return the printer mode switches to their No. 3 or No. 4 positions. Then the apparatus will operate with the printer mode switches in their No. 3 or No. 4 positions because the back contacts K2C in line 19 will have been closed when the relay K2 was deenergized during the normal cycle that occurred during the operation of weighing the package.

The three printer mode switches preferably are operated by a single 4-position knob 28.

A further advantageous feature of the embodiment shown in FIG. 4 is the reweigh lamp I8 in line 14. If the sensing bar should fail to return to its home position at the end of a checking operation, the sensing bar home switch SW1C will fail to open. Then as soon as the scanner returns to its home position the relay K6 will be deenergized and the reweigh lamp I8 will be illuminated by current supplied through the closed back contacts K6A of the relay K6 and the closed sensing bar home switch SW1C. Also if the operator changes the printing plate and adjusts the price knobs while the printer mode switches are in their No. 3 or No. 4 positions the energized condition of the relays K2 and K3 will close the front contacts K2D and K3D in line 15 and the front contacts K3B in line 19 to illuminate the reweigh lamp I8.

Thus the reweigh lamp I8 signals the operator whenever it is necessary for him to reweigh a package because of an error in the data incorporating a weight factor exhibited in the windows 24 and 25.

Various other embodiments of the invention may be devised to meet various requirements.

Having described the invention, I claim:

1. Apparatus for automatically weighing an article placed in weighing position and exhibiting data incorporating a a weight factor, comprising means for storing the data to be exhibited, means under control of the storing means for exhibiting said data, a sensing device which is actuated upon lack of correspondence between the data exhibited and the data stored, an electrical circuit which is conditioned upon actuation of the sensing device to disable said apparatus from responding to an article then in weighing position, and means for thereafter automatically restoring said apparatus to an operative condition by removing an article then in weighing position and again placing an article in weighing position.

2. Apparatus as claimed in claim 1 wherein the data automatically exhibited by the apparatus include a value which incorporates a weight factor and incorporates, as another factor, a price per unit of weight.

3. Apparatus as claimed in claim comprising means for exhibiting data incorporating a weight factor by printing said data.

4. Apparatus as claimed in claim 3 comprising an electrical circuit which is conditioned upon actuation of the sensing device to prevent operation of the printing means.

5. Apparatus as claimed in claim 3 comprising means for conditioning the printing means for operation upon removal of a previously printed label.

6. Apparatus as claimed in claim 1 comprising an electrical circuit which is conditioned upon actuation of the sensing device to disable the apparatus during a delay period from responding to placing an article in weighing position.

7. Apparatus as claimed in claim 6 comprising means operated upon actuation of the sensing device for producing a signal at the end of the delay period denoting that the operator should reweigh the article to reactuate the apparatus.

8. Apparatus as claimed in claim 1 comprising means operated upon actuation of the sensing device for producing a signal denoting that the operator should re-weigh the article to reactuate the apparatus.

9. Apparatus as calimed in claim 8 wherein the means for producing a signal comprises an electrical circuit which energizes means for exhibiting a sign instructing the operator to reweigh.

10. Apparatus for automatically weighing an article placed in weighing position printing value data incorporating a weight factor and a price factor, comprising means for storing the data to be printed, means under control of the storing means for printing said data, a sensing device which is actuated upon a change in the price factor, an electrical circuit which is conditioned upon actuation of the sensing device to prevent repetitive operation of the printing means to print said data, and means for automatically restoring said apparatus to operating condition by performing a new weighing operation and thereby storing new value data incorporating a weight factor and the new price factor.

11. Apparatus as claimed in claim 10 comprising means operated upon actuation of the sensing device for exhibiting a sign instructing the operator to reweigh.

(References on following page)

References Cited by the Examiner

UNITED STATES PATENTS

| | | | |
|---|---|---|---|
| 2,678,206 | 5/54 | Muldoon | 177—5 |
| 2,803,448 | 8/57 | Biebel | 177—3 |
| 2,860,867 | 11/58 | Allen | 177—3 |
| 2,948,466 | 8/60 | Allen | 177—8 X |
| 3,104,806 | 9/63 | Allen | 235—58 |
| 3,120,287 | 2/64 | Allen | 177—5 |

LEO SMILOW, Primary Examiner.

LEYLAND M. MARTIN, Examiner.

UNITED STATES PATENT OFFICE
CERTIFICATE OF CORRECTION

Patent No. 3,211,245                            October 12, 1965

Richard C. Loshbough

It is hereby certified that error appears in the above numbered patent requiring correction and that the said Letters Patent should read as corrected below.

Column 3, line 47, for "1" read -- 11 --; line 73, for "ewighing" read -- weighing --; column 5, line 5, for "resets the" read -- of the scan --; column 6, line 21, for "14" read -- I4 --; column 9, line 27, for "outputs" read -- output --; column 10, line 11, strike out "switch", first occurrence; column 13, line 5, for "14" read -- I4 --; column 16, line 31, after "claim" insert -- 1 --; line 54, for "calimed" read -- claimed --; line 59, after "position" insert -- and --.

Signed and sealed this 6th day of September 1966.

(SEAL)
Attest:

ERNEST W. SWIDER                            EDWARD J. BRENNER
Attesting Officer                                 Commissioner of Patents